US012746642B2

(12) United States Patent
Shih

(10) Patent No.: US 12,746,642 B2
(45) Date of Patent: Sep. 29, 2026

(54) RATCHET WRENCH

(71) Applicant: Pang-Lin Shih, Taichung City (TW)

(72) Inventor: Pang-Lin Shih, Taichung City (TW)

( * ) Notice: Subject to any disclaimer, the term of this patent is extended or adjusted under 35 U.S.C. 154(b) by 356 days.

(21) Appl. No.: 18/495,977

(22) Filed: Oct. 27, 2023

(65) Prior Publication Data

US 2025/0135608 A1 May 1, 2025

(51) Int. Cl.
*B25B 13/46* (2006.01)

(52) U.S. Cl.
CPC .................................. *B25B 13/463* (2013.01)

(58) Field of Classification Search
CPC ..... B25B 13/463; B25B 13/46; B25B 13/461; B25B 13/462; B25B 13/465; B25B 13/466; B25B 13/467; B25B 13/468; B25B 13/48; B25B 13/481; B25B 15/04; B25B 21/004
See application file for complete search history.

(56) References Cited

U.S. PATENT DOCUMENTS

2006/0000317 A1* 1/2006 Chen ..................... B25B 13/463 81/63.2
2013/0118317 A1* 5/2013 Chang ................... B25B 13/463 81/63
2014/0083259 A1* 3/2014 Anderson ............. B25B 13/463 81/63.1
2017/0361430 A1* 12/2017 Mitcheltree ............. F16D 41/12
2018/0015595 A1* 1/2018 Lai ........................ B25B 13/463
2021/0031336 A1* 2/2021 Anderson ............. B25B 13/463

FOREIGN PATENT DOCUMENTS

TW I825944 B * 12/2023

OTHER PUBLICATIONS

Translation of TW I825944 B (Year: 2023).*

* cited by examiner

*Primary Examiner* — David S Posigian
*Assistant Examiner* — Steven Huang
(74) *Attorney, Agent, or Firm* — LANWAY IPR SERVICES; Chun-Ming Shih

(57) ABSTRACT

A ratchet wrench includes a wrench body, a ratchet wheel, a first ring, a pawl member, a direction control unit, a cover, and a snap ring. The wrench body is provided with a first receiving recess, a second receiving recess, two first side faces, a third receiving recess, a fourth receiving recess, a closed end, and two resting faces. The ratchet wheel is provided with a ratchet portion and a mounting portion. The pawl member is provided with an engaging portion, a cavity, a projection, and two second side faces. The direction control unit is rotated to move the pawl member. The direction control unit includes a rotation member, a first push member, and a first elastic member. The ratchet wrench further includes a second push member and a second elastic member that are assembled and received in the fourth receiving recess.

7 Claims, 10 Drawing Sheets

RATCHET WRENCH

BACKGROUND OF THE INVENTION

Field of the Invention

The present invention relates to a hand tool and, more particularly, to a ratchet wrench.

Description of the Related Art

A conventional ratchet wrench 1 was disclosed in the WO-2019/084204, and comprises a handle 2, a head 3, a gear cavity 6, a pawl cavity 12, a reversing control cavity 7, and a lever 206. However, the conventional ratchet wrench 1 has the following disadvantage. The yoke 207 drives the pin 208 so that the pawl 201 will press the yoke 207. The pawl 201 is moved in a recess to drive the reversing control member 203. In such a manner, the relative position of the pawl cavity 12 and the reversing control cavity 7 must be designed and worked very precisely to facilitate the pawl 201 driving the reversing control member 203. Thus, if the relative position of the pawl cavity 12 and the reversing control cavity 7 has a slight error, the pawl 201 cannot drive the reversing control member 203 exactly.

BRIEF SUMMARY OF THE INVENTION

In accordance with the present invention, there is provided a ratchet wrench comprising a wrench body, a ratchet wheel, a first ring, a pawl member, a direction control unit, a cover, and a snap ring. The wrench body is provided with a first receiving recess, a second receiving recess, two first side faces, a third receiving recess, a fourth receiving recess, a cover groove, a closed end, a snap ring groove, and two resting faces. The ratchet wheel is provided with a ratchet portion and a mounting portion. The pawl member is provided with an engaging portion, a diameter, a cavity, a projection, and two second side faces. The direction control unit is pivotally mounted in the third receiving recess, and is rotated to move the pawl member leftward or rightward in the second receiving recess. The direction control unit includes a rotation member, a first push member, and a first elastic member. The ratchet wrench further comprises a second push member and a second elastic member. The second push member and the second elastic member are assembled and received in the fourth receiving recess.

According to the primary advantages of the present invention, at least one of the three third abutting portions of the rotation member rests on the second abutting portion, and the first push member rests on the first abutting portion, so that the pawl member restricts at least one of the three third abutting portions and the first push member. The first push member is received in the restriction hole so that the direction control unit is pivotally mounted in the third receiving recess. Thus, a double restriction structure is defined between the direction control unit and the pawl member, so that when the ratchet wrench is hit, the direction control unit will not be easily detached from the third receiving recess.

According to another advantages of the present invention, when the first push member is pushed by the elastic force of the first elastic member and presses the cavity, the thrust portion presses one of the two first faces. Thus, when the rotation member is rotated, the thrust portion enters one of the two first faces automatically, to achieve an automatic positioning effect.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
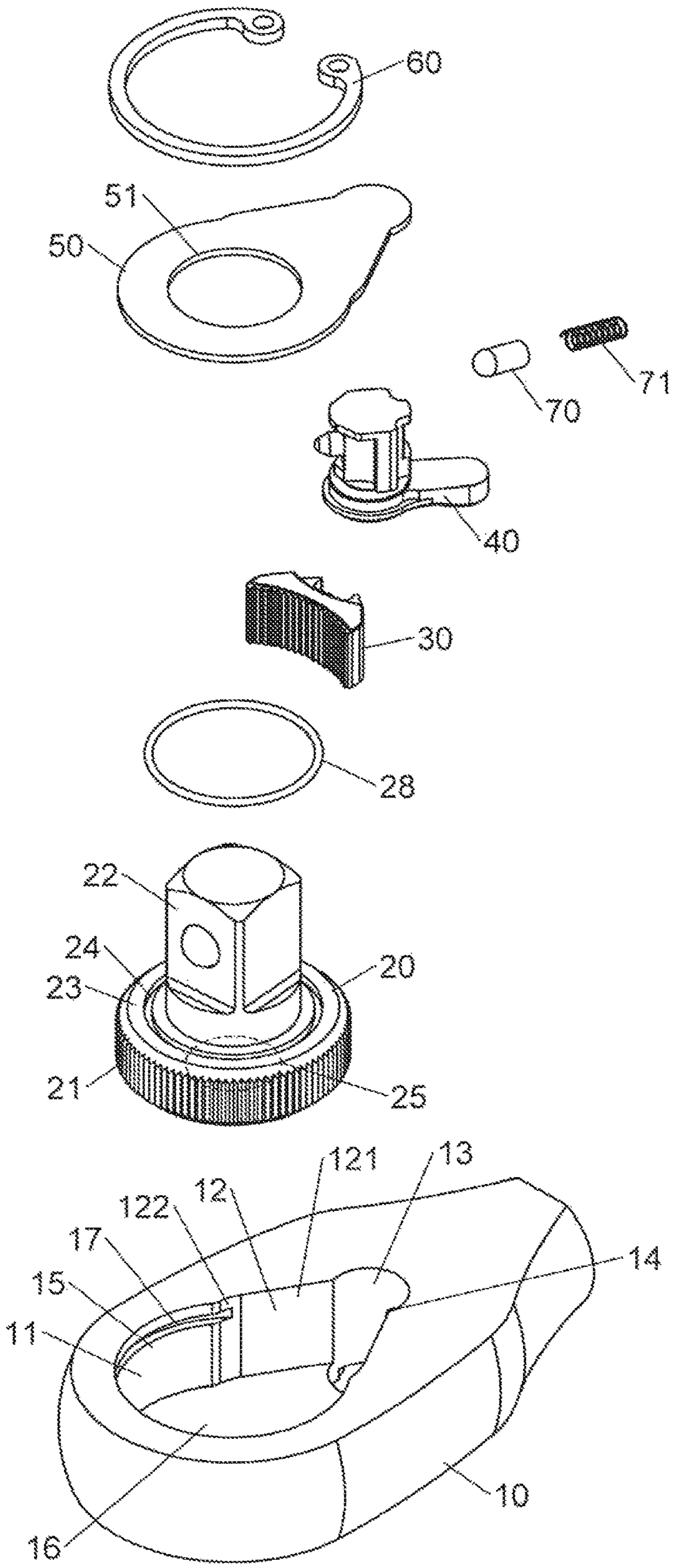
FIG. 1 is an exploded perspective view of a ratchet wrench in accordance with the preferred embodiment of the present invention.
Figure 3:
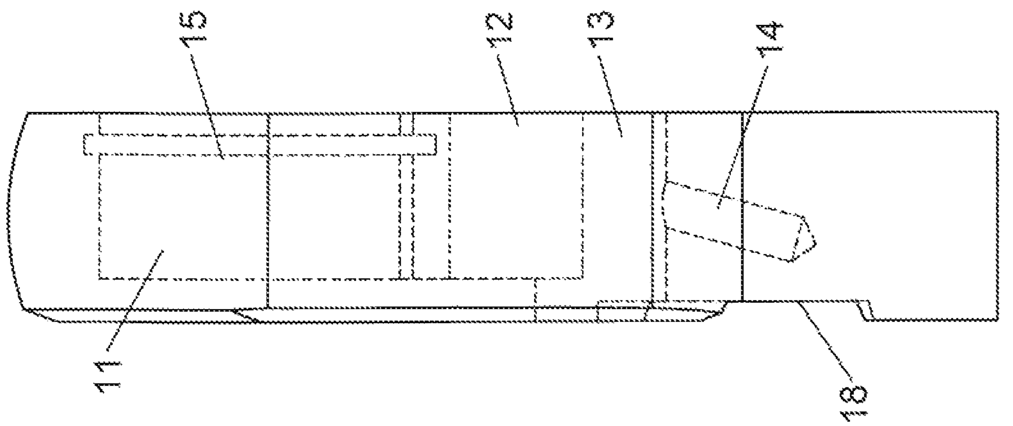
FIG. 3 is a side view of the wrench body of the ratchet wrench in accordance with the preferred embodiment of the present invention.
Figure 2:
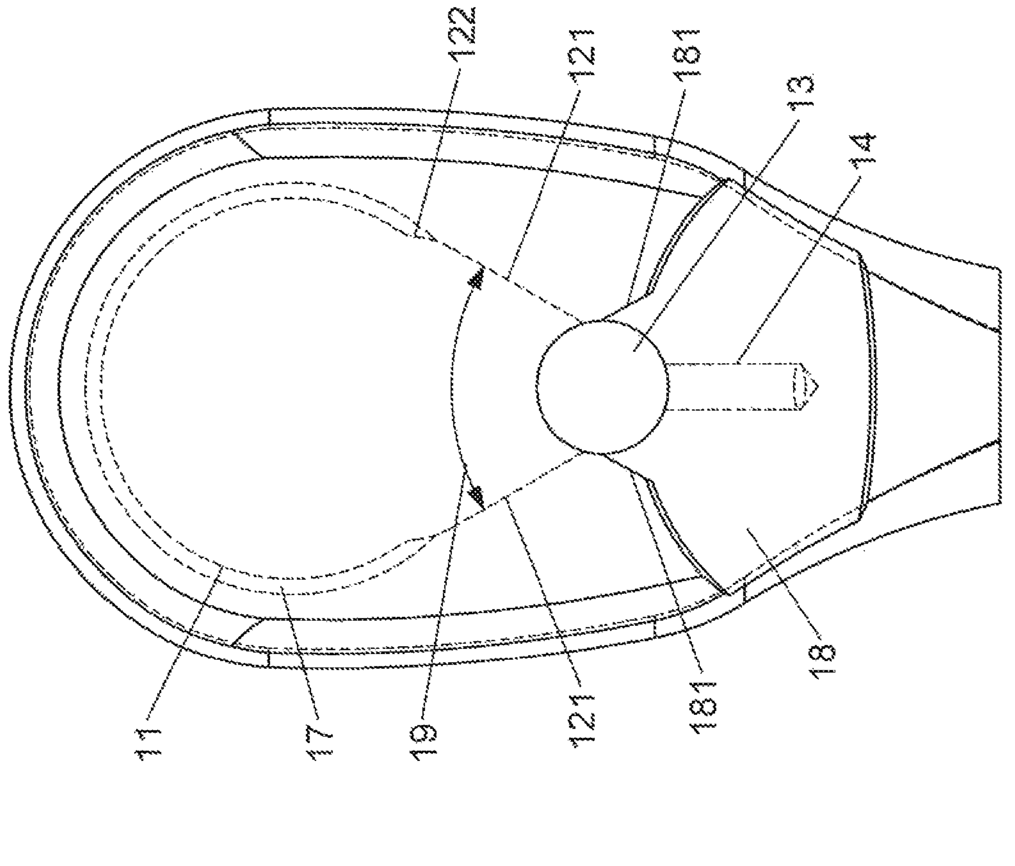
FIG. 2 is a bottom view of the wrench body of the ratchet wrench in accordance with the preferred embodiment of the present invention.
Figure 5:
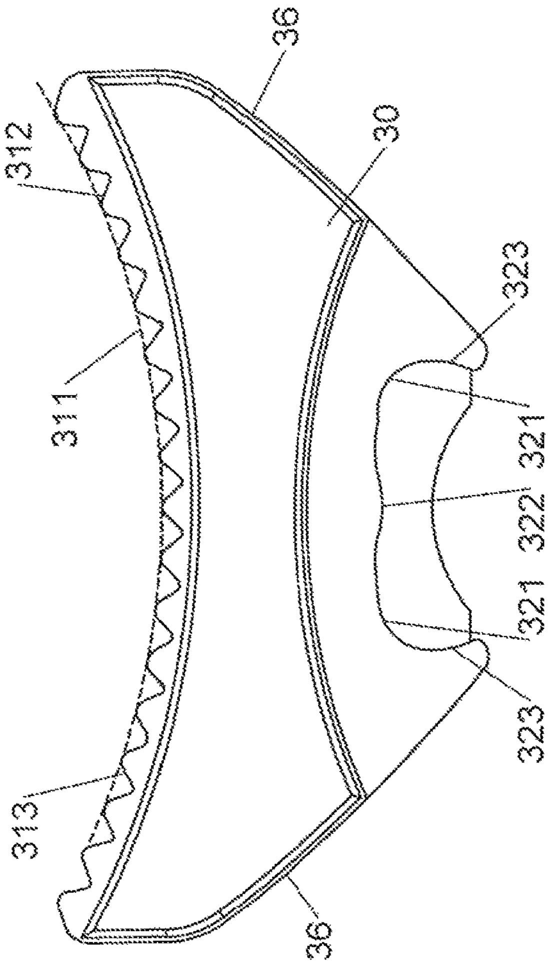
FIG. 5 is a top view of the pawl member as shown in FIG. 4.

Referring to the drawings and initially to FIGS. 1-10, a ratchet wrench in accordance with the preferred embodiment of the present invention comprises a wrench body 10, a ratchet wheel 20, a first ring 28, a pawl member 30, a direction control (or change or turning or steering) unit 40, a cover 50, and a snap ring 60.

The wrench body 10 has an end provided with a first receiving recess 11. The first receiving recess 11 has a circular shape. The first receiving recess 11 has an open end. The wrench body 10 is provided with a second receiving recess 12 beside the first receiving recess 11. The second receiving recess 12 has a diameter less than that of the first receiving recess 11. The second receiving recess 12 has a center disposed in the first receiving recess 11. The second receiving recess 12 is connected to the first receiving recess 11. The second receiving recess 12 has an open end. The second receiving recess 12 has two first side faces 121. The two first side faces 121 are arranged symmetrically relative to the second receiving recess 12. Each of the two first side faces 121 is a flat plane. The second receiving recess 12 is provided with two arcuate faces 122. Each of the two arcuate faces 122 connects one of the two first side faces 121 and the first receiving recess 11. The wrench body 10 is provided with a third receiving recess 13 beside the second receiving recess 12. The third receiving recess 13 is connected to the second receiving recess 12. The third receiving recess 13 has an open top and an open bottom. The third receiving recess 13 is a circular hole penetrating the wrench body 10. The wrench body 10 is provided with a fourth receiving recess 14 beside the third receiving recess 13. The fourth receiving recess 14 is connected to the third receiving recess 13. An angle is defined between an axis of the fourth receiving recess 14 and that of the third receiving recess 13. The fourth receiving recess 14 has a circular shape. The wrench body 10 has an open top provided with a cover groove 15. The cover groove 15 extends through the first receiving recess 11, the second receiving recess 12, and the third receiving recess 13. The wrench body 10 has a bottom provided with a closed end 16. The closed end 16 extends through the first receiving recess 11 and the second receiving recess 12. The wrench body 10 is provided with a snap ring groove 17. The cover groove 15 is arranged between the first receiving recess 11 and the snap ring groove 17. The snap ring groove 17 has an annular shape. The wrench body 10 is provided with a cutout 18. The cutout 18 is connected to the third receiving recess 13. The cutout 18 is close to the closed end 16. The cutout 18 is provided with two resting faces 181. Each of the two resting faces 181 is a plane or an arcuate face. An angle 19 is defined between the two first side faces 121. The angle 19 is ranged between fifty-five and one sixty-five degrees (55°-65°). The angle 19 is close to sixty degrees (60°).

The ratchet wheel 20 is pivotally mounted in the first receiving recess 11. The ratchet wheel 20 has a periphery provided with a ratchet portion 21. The ratchet portion 21 is a toothed portion having an annular shape. The ratchet wheel 20 is provided with a mounting portion 22. The mounting portion 22 protrudes from the first receiving recess 11. The mounting portion 22 is a tetragonal (or square) head. The ratchet wheel 20 has an end provided with an end face 23. The end face 23 faces the cover groove 15. The end face 23 is provided with a first annular groove 24. The first annular groove 24 is arranged between the ratchet portion 21 and the mounting portion 22. The first annular groove 24 has a ring shape. The ratchet wheel 20 is provided with a recessed portion 25 facing the closed end 16. The recessed portion 25 is an arcuate depression. The recessed portion 25 decreases a friction area between the ratchet wheel 20 and the closed end 16 when the ratchet wheel 20 is rotated in the first receiving recess 11.

The first ring 28 is received in the first annular groove 24. The first ring 28 surrounds the mounting portion 22. The first ring 28 is made of resilient material.

The pawl member 30 is received in the second receiving recess 12. The pawl member 30 is controlled and is movable leftward and rightward in the second receiving recess 12. The pawl member 30 has a front side provided with an engaging portion 31 engaging the ratchet portion 21. The engaging portion 31 has a diameter 311. The diameter 311 of the engaging portion 31 is slightly more than that of the ratchet portion 21. The engaging portion 31 has a first end provided with a first toothed part 312 and a second end provided with a second toothed part 313. The diameter of the engaging portion 31 is slightly more than that of the ratchet portion 21, so that when the pawl member 30 is received in the second receiving recess 12, a gap (or clearance) is defined between the first toothed part 312 or the second toothed part 313 and the ratchet portion 21. The gap is increased gradually from a middle of the engaging portion 31 toward the first toothed part 312 or the second toothed part 313.

The pawl member 30 has a rear side provided with a cavity 32. The cavity 32 has an arcuate shape. The cavity 32 has two first faces 321, a second face 322, and two third faces 323. The two first faces 321 are arranged at two corners of the cavity 32. Each of the two first faces 321 is located at the deepest position of the cavity 32. Each of the two first faces 321 is arranged between the second face 322 and one of the two third faces 323. Each of the two first faces 321 has a concave shape with a single diameter. The second face 322 is disposed at a middle of the cavity 32. The second face 322 has a convex shape. The two first faces 321 are arranged symmetrically relative to the second face 322. The two third faces 323 are arranged at two end openings of the cavity 32. The two third faces 323 are arranged symmetrically relative to the second face 322. Each of the two third faces 323 is tangent to one of the two first faces 321. Each of the two third faces 323 has a concave shape with a single diameter. Each of the two third faces 323 has a diameter more than that of each of the two first faces 321.

The pawl member 30 is provided with a projection (or rib) 33 received in the cavity 32. The projection 33 is close to the closed end 16. The pawl member 30 is provided with a first abutting portion 34 arranged between the projection 33 and the cavity 32. The first abutting portion 34 has a planar shape. The pawl member 30 is provided with a second abutting portion 35 facing the open end of the second receiving recess 12. The cavity 32 is arranged between the first abutting portion 34 and the second abutting portion 35. The second abutting portion 35 has a planar shape. The pawl member 30 has two second side faces 36. When the pawl member 30 is received in the second receiving recess 12, one of the two second side faces 36 rests on one of the two first side faces 121, and the other one of the two second side faces 36 is distant from the other one of the two first side faces 121. Each of the two second side faces 36 has a convex shape.

Each of the two first side faces 121 is a flat plane, and each of the two second side faces 36 has a convex shape, so that when one of the two second side faces 36 rests on one of the two first side faces 121, a contact between one of the two second side faces 36 and one of the two first side faces 121 defines a line segment. Thus, the pawl member 30 is pivoted slightly with the line segment serving an axis so that the engaging portion 31 engages the ratchet portion 21 easily.

The direction control unit 40 is pivotally mounted in the third receiving recess 13, and is rotated to move the pawl member 30 leftward or rightward in the second receiving recess 12, so as to control rotation of the ratchet wheel 20. The direction control unit 40 includes a rotation (swivel or turning) member 41, a first push member 42, a first elastic member 43, and a second ring 44.

The rotation member 41 is provided with a cylindrical block 411. The cylindrical block 411 is pivotally mounted in the third receiving recess 13. The cylindrical block 411 is provided with a restriction (or limit) hole 412. The restriction hole 412 aligns with the cavity 32. The restriction hole 412 has a circular shape. The cylindrical block 411 has a first end provided with three third abutting portions 413. Each of the three third abutting portions 413 is directed toward the pawl member 30. When the rotation member 41 is rotated, at least one of the three third abutting portions 413 rests on the second abutting portion 35, so that the pawl member 30 is restricted by the three third abutting portions 413 of the rotation member 41 and cannot be detached from the second receiving recess 12 of the wrench body 10. The rotation member 41 is provided with a drive knob 414 received in the cutout 18. The drive knob 414 has a first side abutting one of the two resting faces 181. When the rotation member 41 is rotated, the drive knob 414 has a second side abutting the other one of the two resting faces 181. The cylindrical block 411 is provided with two first slots 415 and a second slot 416. One of the two first slots 415 aligns with the fourth receiving recess 14. When the direction control unit 40 is rotated, and the pawl member 30 is moved to a middle position of the second receiving recess 12, the second slot 416 aligns with the fourth receiving recess 14. The two first slots 415 and the second slot 416 are distant from the restriction hole 412. The second slot 416 is arranged between the two first slots 415. Each of the two first slots 415 has an arcuate shape. The cylindrical block 411 has a second end provided with a second annular groove 417. The second annular groove 417 is distant from the three third abutting portions 413. The second annular groove 417 has a concave ring shape.

The first push member 42 and the first elastic member 43 are assembled and received in the restriction hole 412. The first push member 42 has a first end provided with a thrust portion 421. When the first push member 42 is pushed by an elastic force of the first elastic member 43, the thrust portion 421 presses one of the two first faces 321. Thus, the thrust portion 421 is restricted by one of the two third faces 323 and will not be detached from the cavity 32. The first push member 42 has a second end provided with a pillar 422. The pillar 422 has a peripheral face abutting the first abutting portion 34. Thus, the first push member 42 is restricted by the first abutting portion 34, and the rotation member 41 is restricted by the first push member 42, so that the rotation member 41 is pivotally mounted and limited in the third receiving recess 13. The pillar 422 has a column shape. The first push member 42 is provided with a conic face 423 located between the thrust portion 421 and the pillar 422. The thrust portion 421 has a reduced diameter by provision of the conic face 423, so that the reduced diameter of the thrust portion 421 mates with a diameter of each of the two first faces 321.

When the rotation member 41 is rotated, the thrust portion 421 presses and passes the second face 322, and the first elastic member 43 is compressed by the first push member 42, so that the first elastic member 43 has an elastic resisting (or restoring) force when the rotation member 41 is turned.

The second ring 44 is retained in the second annular groove 417. The second annular groove 417 seals a gap between the rotation member 41 and the third receiving recess 13 to provide a waterproof effect therebetween.

The cover 50 is received in the cover groove 15. The cover 50 closes the first receiving recess 11, the second receiving recess 12, and the third receiving recess 13. The cover 50 slightly rests on the end face 23 or a gap is defined between the cover 50 and the end face 23. The first ring 28 is biased between the first annular groove 24 and the cover 50. The first ring 28 seals the wrench body 10, the ratchet wheel 20, and the cover 50 without a gap defined therebetween, so that the ratchet wrench has a waterproof effect. The cover 50 is provided with a through hole 51. The through hole 51 has a circular shape. The mounting portion 22 protrudes from the through hole 51.

The snap ring 60 has a C-shaped configuration. The snap ring 60 is retained in the snap ring groove 17 and rests on the cover 50. The cover 50 is restricted by the snap ring 60 and cannot be detached from the cover groove 15.

The ratchet wrench further comprises a second push member 70 and a second elastic member 71. The second push member 70 and the second elastic member 71 are assembled and received in the fourth receiving recess 14. The second push member 70 is pushed by an elastic force of the second elastic member 71 and presses one of the two first slots 415. The second push member 70 is used to position the direction control unit 40.

Figure 9:
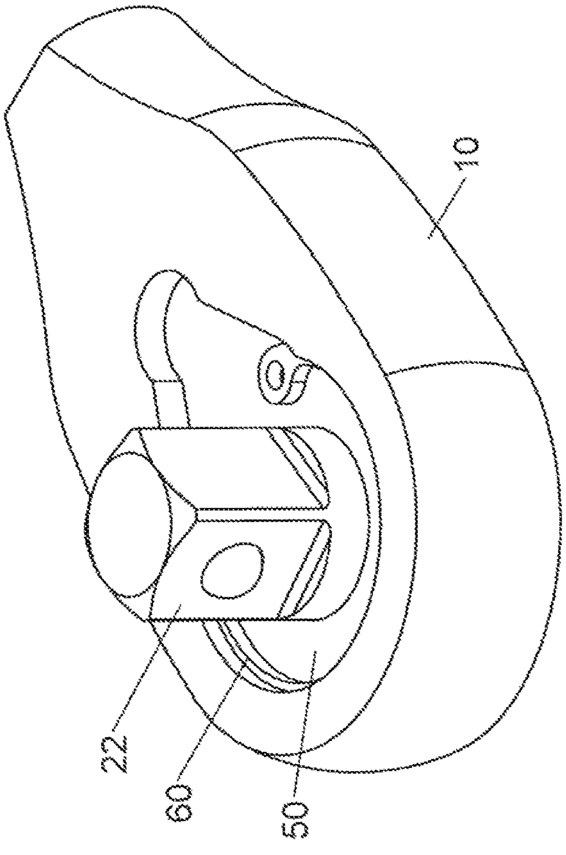
FIG. 9 is a perspective assembly view of the ratchet wrench in accordance with the preferred embodiment of the present invention.
Figure 10:
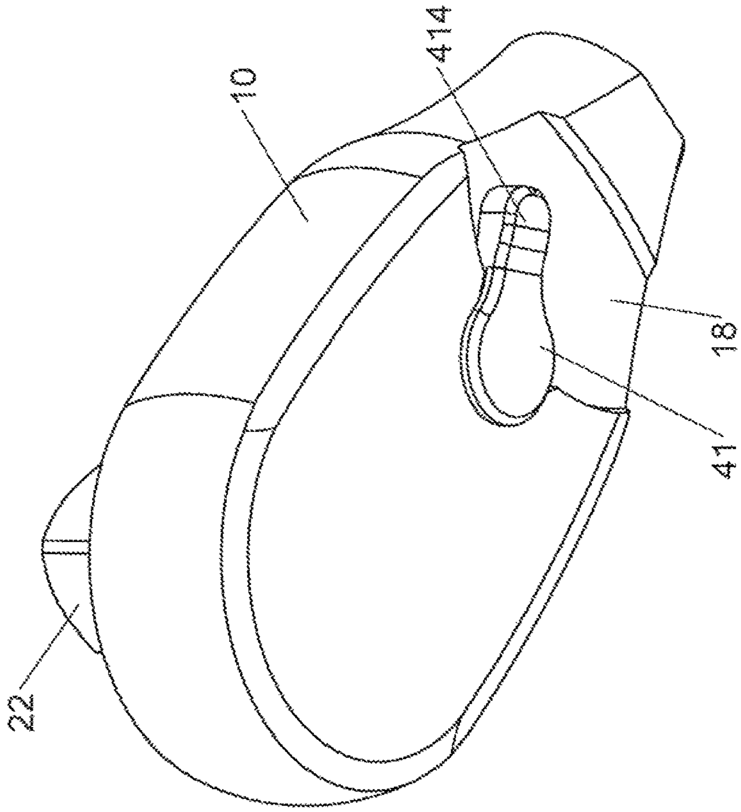
FIG. 10 is another perspective assembly view of the ratchet wrench in accordance with the preferred embodiment of the present invention.

Referring to FIGS. 9 and 10 with reference to FIGS. 1-8, the wrench body 10, the ratchet wheel 20, the first ring 28, the pawl member 30, the direction control unit 40, the cover 50, the snap ring 60, the second push member 70, and the second elastic member 71 are assembled to construct the ratchet wrench as shown in FIGS. 9 and 10. The ratchet wheel 20 is pivotally mounted in the first receiving recess 11. The pawl member 30 is received in the second receiving recess 12. The direction control unit 40 is pivotally mounted in the third receiving recess 13. The drive knob 414 is received in the cutout 18. When the drive knob 414 is driven by a user's hand, the direction control unit 40 is rotated to control the pawl member 30, so that the pawl member 30 is moved leftward and rightward in the second receiving recess 12, so as to control a two-directional rotation (including the normal direction and the reverse direction) of the ratchet wheel 20. The cover 50 is received in the cover groove 15. The snap ring 60 is retained in the snap ring groove 17 and rests on the cover 50 so that the cover 50 is restricted by the snap ring 60 and cannot be detached from the cover groove 15.

Figure 13:
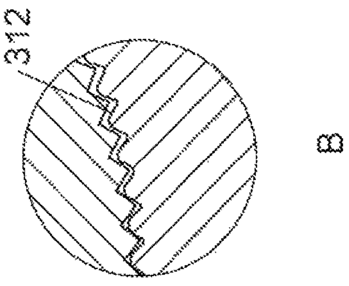
FIG. 13 is a locally enlarged view of the ratchet wrench taken along circle B as shown in FIG. 12.
Figure 12:
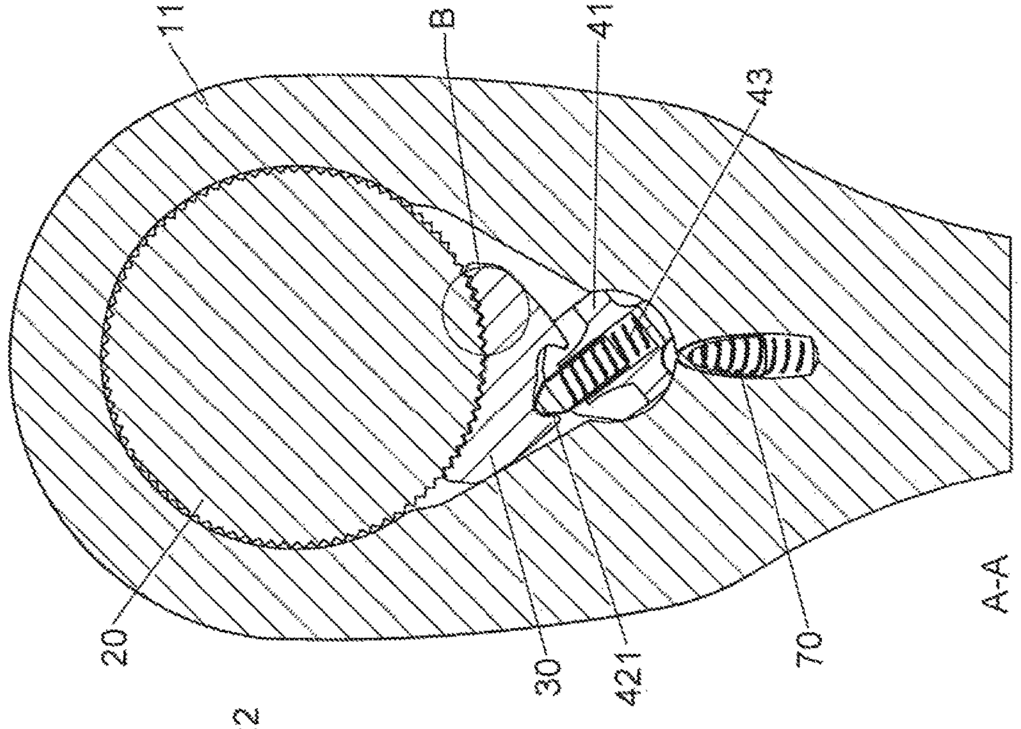
FIG. 12 is a cross-sectional view of the ratchet wrench taken along line A-A as shown in FIG. 11.
Figure 11:
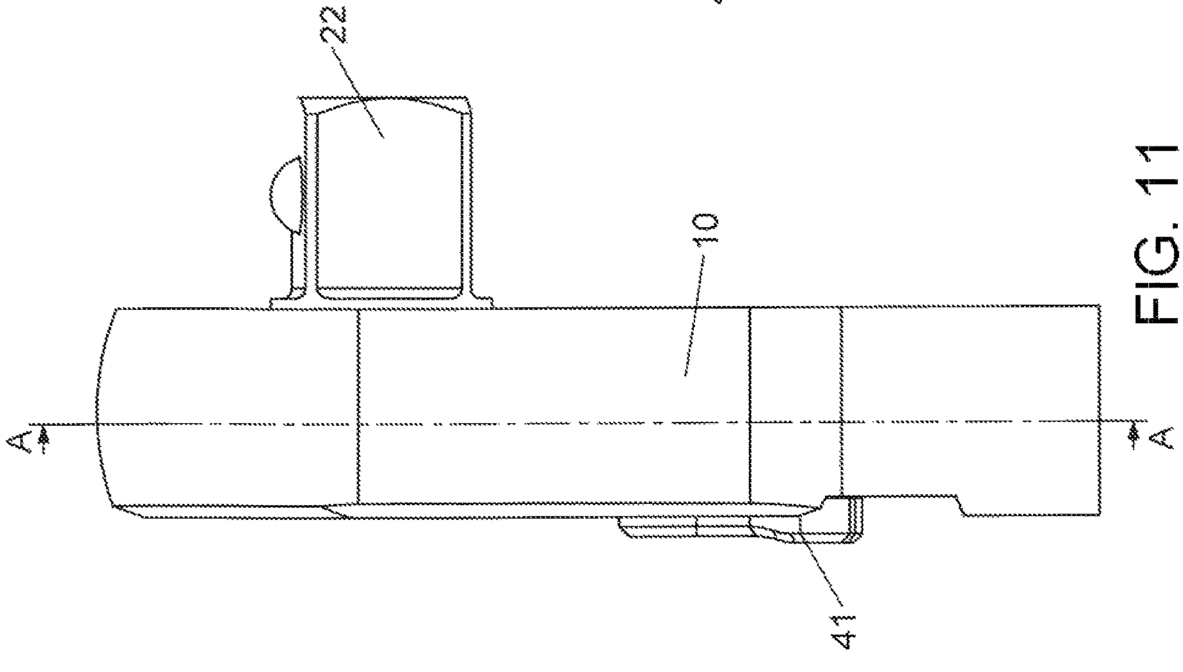
FIG. 11 is a side view of the ratchet wrench in accordance with the preferred embodiment of the present invention.

Referring to FIGS. 11-13 with reference to FIGS. 1-10, the diameter of the engaging portion 31 is slightly more than that of the ratchet portion 21, so that a gap is defined between the first toothed part 312 and the ratchet portion 21. Thus, the first toothed part 312 does not mesh with the ratchet portion 21 completely as shown in FIG. 13. One of the two second side faces 36 rests on one of the two first side faces 121. The direction control unit 40 is pivotally mounted in the third receiving recess 13. The first push member 42 is received in the cavity 32. When the first push member 42 is pushed by the elastic force of the first elastic member 43, the thrust portion 421 presses one of the two first faces 321. Thus, the thrust portion 421 is restricted by one of the two third faces 323 and will not be detached from the cavity 32. In addition, the first push member 42 is restricted by the first abutting portion 34, and the rotation member 41 is restricted by the first push member 42, so that the rotation member 41 is limited in the third receiving recess 13. The second push member 70 and the second elastic member 71 are received in the fourth receiving recess 14. The second push member 70 is pushed by the elastic force of the second elastic member 71 and presses one of the two first slots 415.

Figure 14:
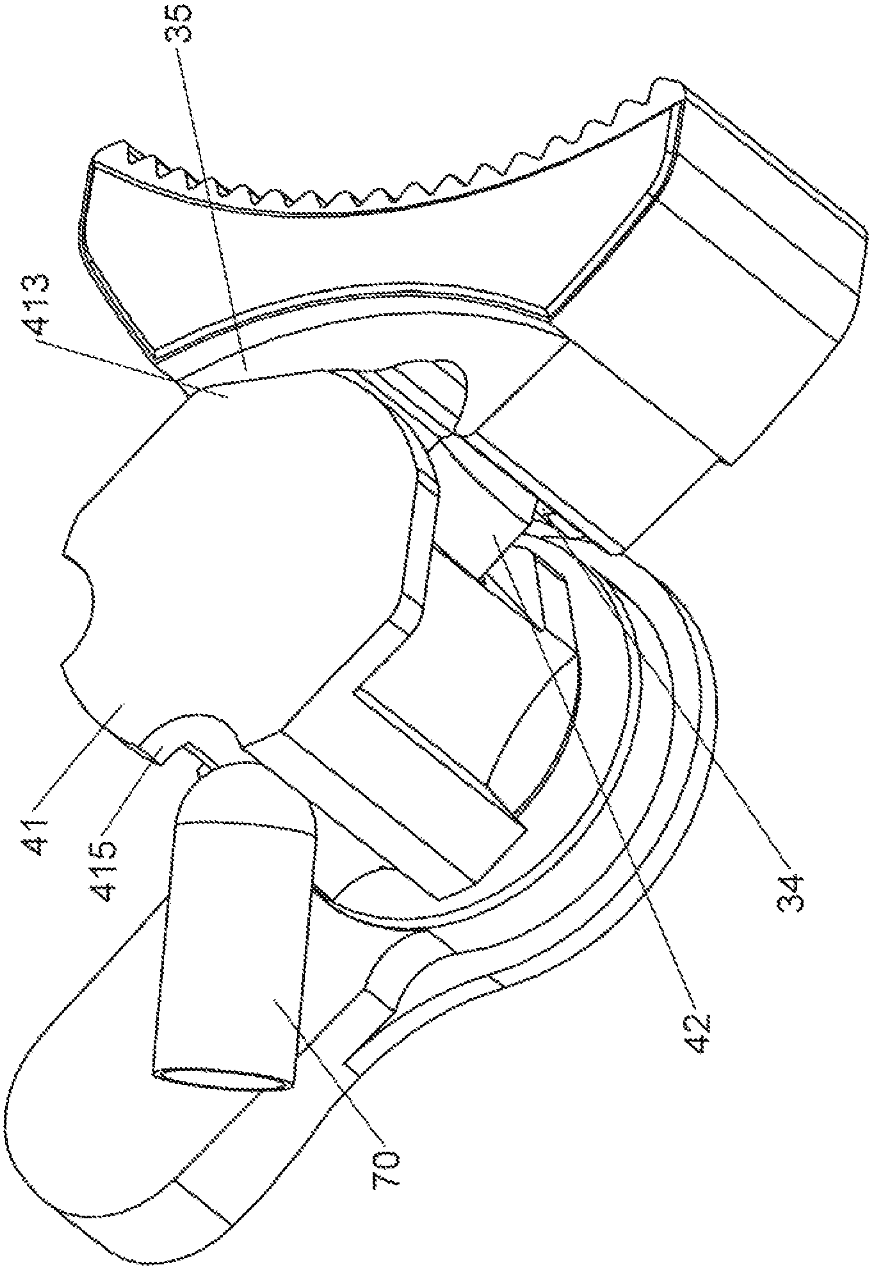
FIG. 14 is a partial perspective assembly view of the ratchet wrench in accordance with the preferred embodiment of the present invention.

Referring to FIG. 14 with reference to FIGS. 1-13, the direction control unit 40 is rotated so that the pawl member 30 is moved to the middle of the second receiving recess 12. The middle one of the three third abutting portions 413 rests on the second abutting portion 35. The first push member 42 is restricted by the first abutting portion 34. Thus, the rotation member 41 is pivotally mounted in the third receiving recess 13. At this time, the second push member 70 is pushed by the elastic force of the second elastic member 71 and presses the second slot 416. When the direction control unit 40 is further rotated, the second push member 70 is moved to pass the second slot 416 and align with the other one of the two first slots 415. Thus, the second push member 70 is pushed by the elastic force of the second elastic member 71 and presses the other one of the two first slots 415 as shown in FIG. 14.

Figure 15:
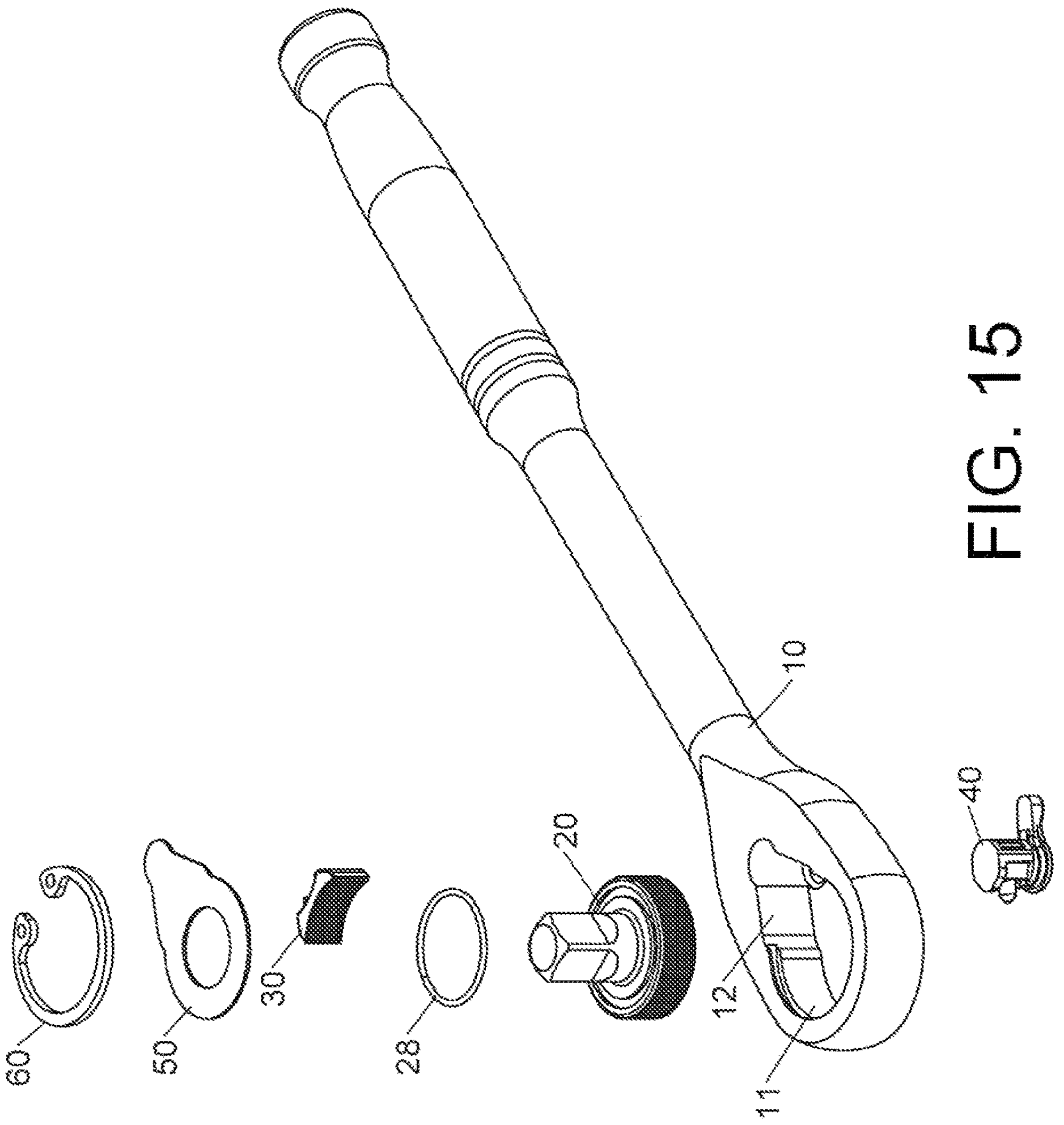
FIG. 15 is an exploded perspective view of a ratchet wrench in accordance with a second preferred embodiment of the present invention.
Figure 16:
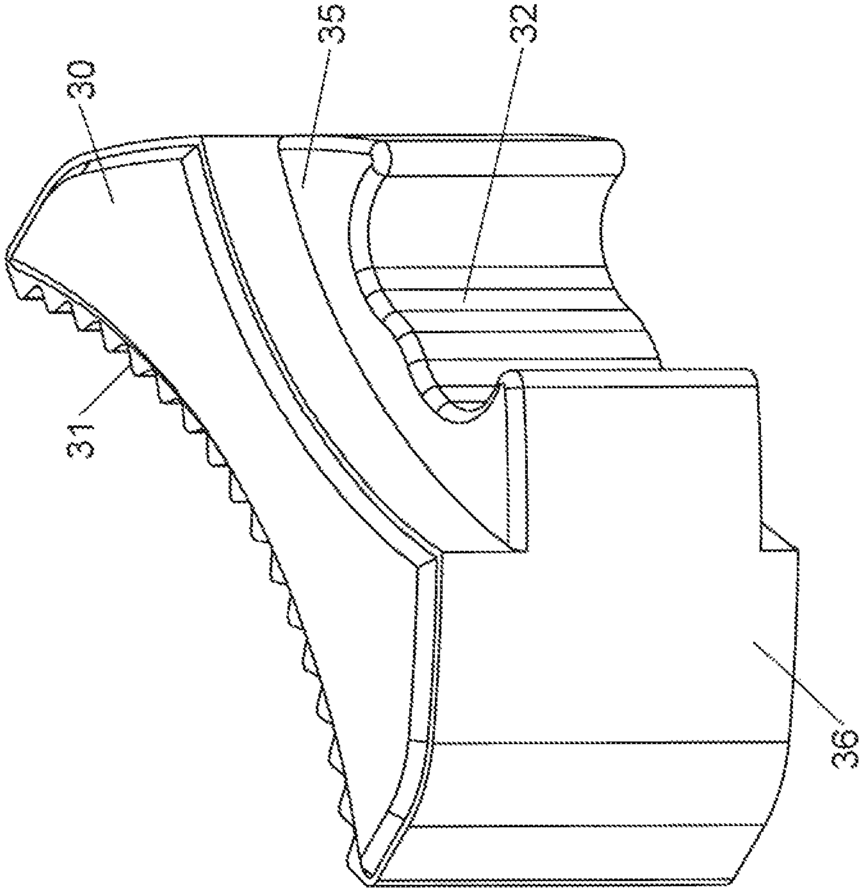
FIG. 16 is a perspective view of a pawl member of the ratchet wrench in accordance with the second preferred embodiment of the present invention.
Figure 17:
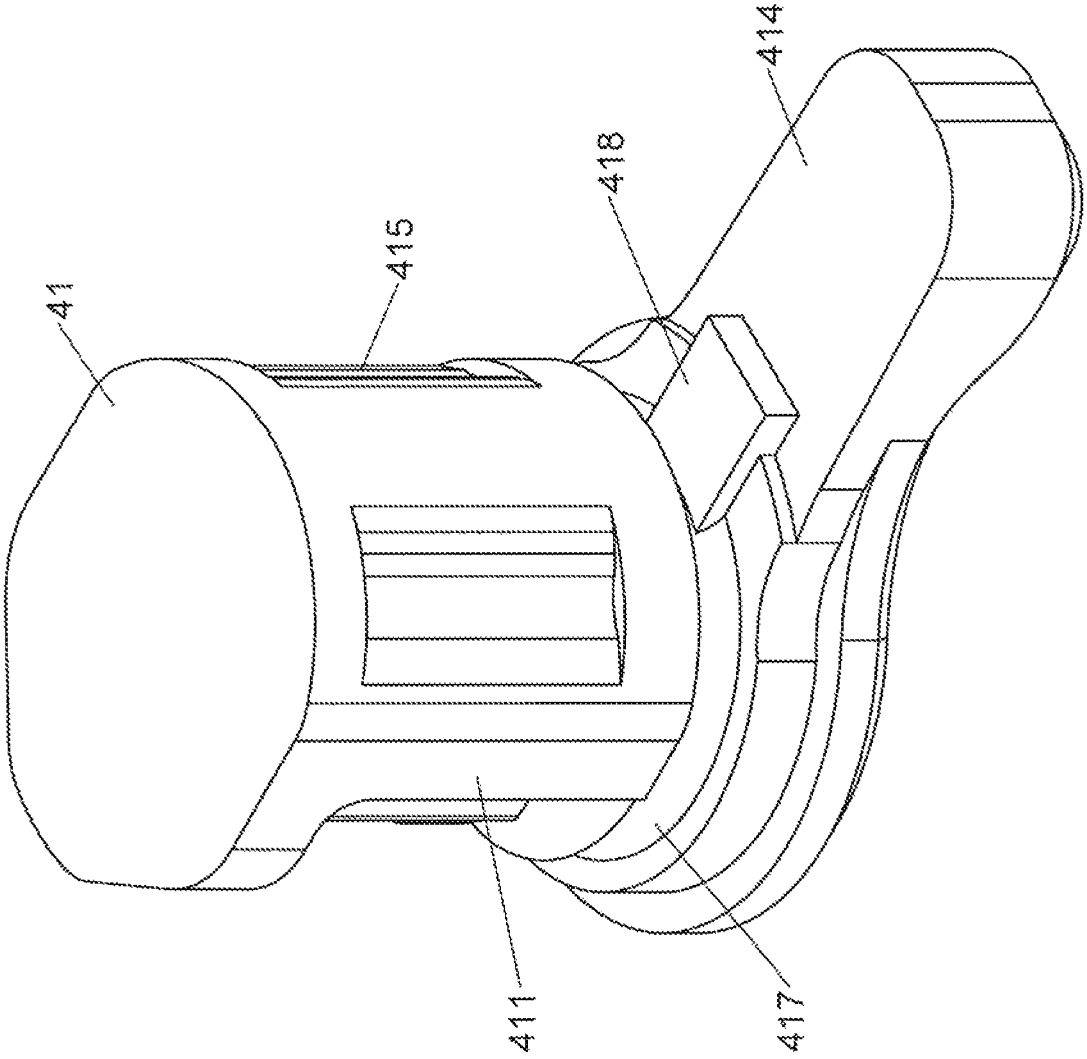
FIG. 17 is a perspective view of a rotation member of the ratchet wrench in accordance with the second preferred embodiment of the present invention.

Referring to FIGS. 15-17 with reference to FIGS. 1-14, the wrench body 10 is not provided with the fourth receiving recess 14, the ratchet wrench is not provided with the second push member 70 and the second elastic member 71, and the pawl member 30 is not provided with the projection 33 and the first abutting portion 34. The rotation member 41 is provided with a protrusion 418 protruding from the drive knob 414. The protrusion 418 is arranged between the second annular groove 417 and the drive knob 414. The protrusion 418 rests on one of the two resting faces 181, so that a gap is defined between the drive knob 414 and one of the two resting faces 181, to prevent the drive knob 414 from rubbing one of the two resting faces 181 when the rotation member 41 is rotated on the wrench body 10.

In another preferred embodiment of the present invention, the mounting portion 22 is a polygonal recess for mounting a screw member.

Accordingly, the ratchet wrench has the following advantages.

1. Referring to FIG. 14, at least one of the three third abutting portions 413 of the rotation member 41 rests on the second abutting portion 35, and the first push member 42 rests on the first abutting portion 34, so that the pawl member 30 restricts at least one of the three third abutting portions 413 and the first push member 42. The first push member 42 is received in the restriction hole 412 so that the direction control unit 40 is pivotally mounted in the third receiving recess 13. Thus, a double restriction structure is defined between the direction control unit 40 and the pawl member 30, so that when the ratchet wrench is hit, the direction control unit 40 will not be easily detached from the third receiving recess 13.

2. Referring to FIG. 12, when the first push member 42 is pushed by the elastic force of the first elastic member 43 and presses the cavity 32, the thrust portion 421 presses one of the two first faces 321. Thus, when the rotation member 41 is rotated, the thrust portion 421 enters one of the two first faces 321 automatically, to achieve an automatic positioning effect.

3. The first push member 42 has a peripheral face abutting one of the two first faces 321, one of the two third faces 323, and the first abutting portion 34, so that the first push member 42 is limited by one of the two first faces 321 and one of the two third faces 323, to prevent the first push member 42 from being detached from the cavity 32 during rotation of the rotation member 41. Thus, each of the two third faces 323 limits the maximum rotation angle of the rotation member 41.

4. Referring to FIG. 14, when the direction control unit 40 is rotated until the pawl member 30 is moved to the middle of the second receiving recess 12, the thrust portion 421 presses the second face 322, and the first elastic member 43 is compressed by the first push member 42, so that the first elastic member 43 has an elastic resisting force when the rotation member 41 is turned.

In such a manner, the first elastic member 43 provides an elastic resisting force to the rotation member 41 when the direction control unit 40 is rotated, so that the rotation member 41 cannot be rotated easily. Thus, the direction control unit 40 and the pawl member 30 cannot be switched between the normal rotation and the reverse rotation automatically.

5. The thrust portion 421 has a reduced diameter to cope with the curved diameter of each of the two first faces 321. Thus, the curved diameter of each of the two first faces 321 may be decreased so that the pawl member 30 has a smaller specification or size to form the two first faces 321, the second face 322, and the two third faces 323.

6. Referring to FIG. 13, the pawl member 30 is received in the second receiving recess 12 with the engaging portion 31 meshing with the ratchet portion 21. In practice, the diameter of the engaging portion 31 is slightly more than that of the ratchet portion 21, and a gap is defined between the first toothed part 312 and the ratchet portion 21, so that the first toothed part 312 does not mesh with the ratchet portion 21 completely. Thus, when the pawl member 30 meshes with the ratchet wheel 20, the ratchet portion 21 will not engage the engaging portion 31 completely to facilitate rotation of the ratchet wheel 20.

7. Each of the two first side faces 121 has a planar shape, and each of the two second side faces 36 has a convex shape, so that when one of the two second side faces 36 rests on one of the two first side faces 121, a contact between one of the two second side faces 36 and one of the two first side faces 121 defines a line segment. Thus, the pawl member 30 is pivoted slightly with the line segment serving an axis so that the engaging portion 31 engages the ratchet portion 21 easily.

8. The ratchet wheel 20 is provided with the recessed portion 25 that decreases the friction area between the end face of the ratchet wheel 20 and the closed end 16 of the wrench body 10 when the ratchet wheel 20 is rotated in the first receiving recess 11.

Figure 4:
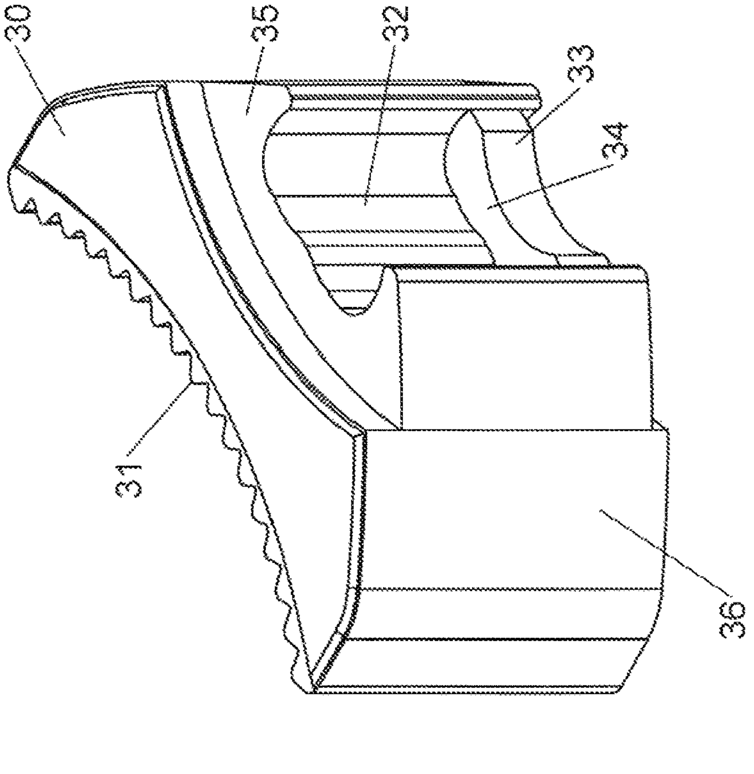
FIG. 4 is a perspective view of a pawl member of the ratchet wrench in accordance with the preferred embodiment of the present invention.
Figure 6:
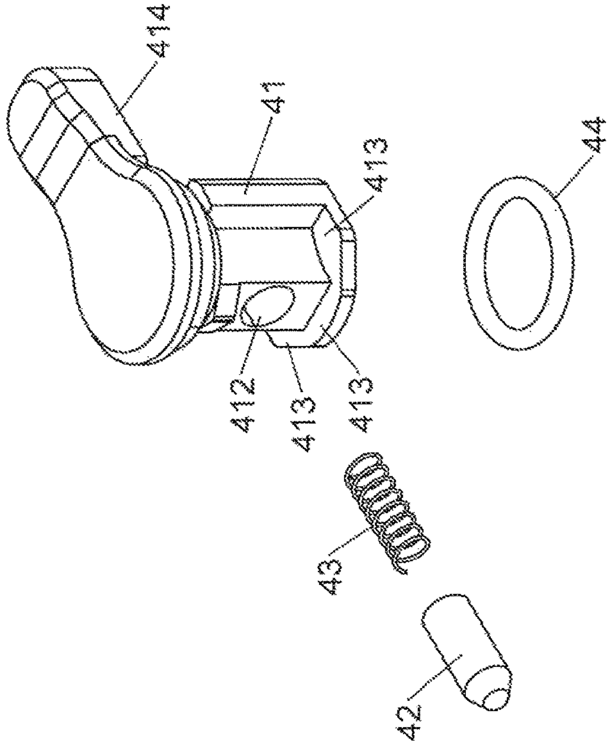
FIG. 6 is an exploded perspective view of a direction control unit of the ratchet wrench in accordance with the preferred embodiment of the present invention.
Figure 7:
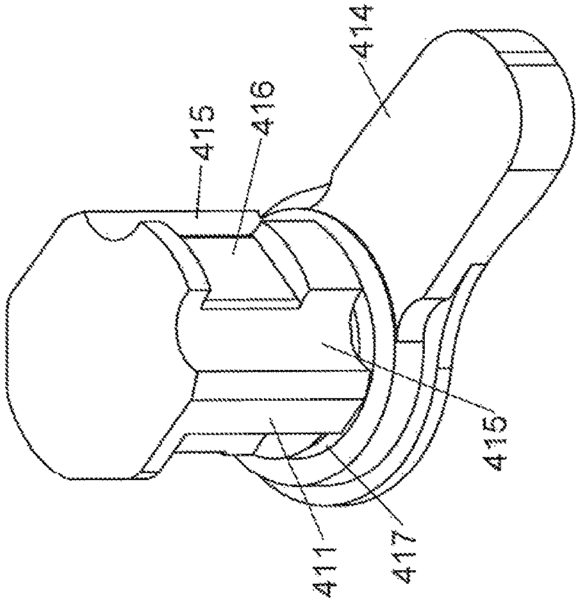
FIG. 7 is a perspective view of a rotation member of the ratchet wrench in accordance with the preferred embodiment of the present invention.
Figure 8:
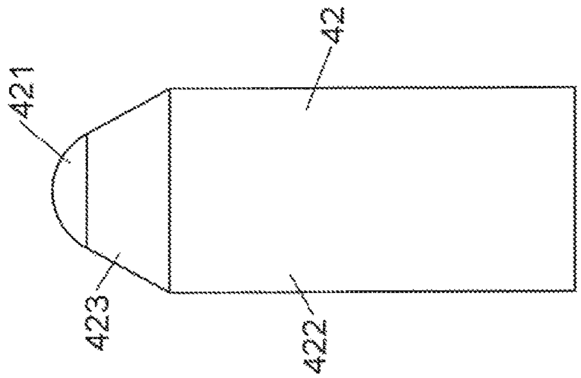
FIG. 8 is a top view of a first push member of the ratchet wrench in accordance with the preferred embodiment of the present invention.

9. Referring to FIG. 4, the pawl member 30 is provided with the projection 33 that serves as a reinforcing rib so that the pawl member 30 can withstand a larger torque. In such a manner, the pawl member 30 may be formed by powder molding or injection molding no matter when the pawl member 30 is stripped from the mold from top to bottom or from front to back during the mold unloading process, so that the pawl member 30 at least has two molding ways.

10. The second push member 70 is pushed by the elastic force of the second elastic member 71 and presses one of the two first slots 415 to position the direction control unit 40. Thus, when the direction control unit 40 is rotated, the second push member 70 has to compress the second elastic member 71 and pass the second slot 416 so as to reach one of the two first slots 415 or the other one of the two first slots 415, thereby providing a safety function.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A ratchet wrench comprising:

a wrench body, a ratchet wheel, a first ring, a pawl member, a direction control unit, a cover, and a snap ring;

wherein:

the wrench body has an end provided with a first receiving recess;
the first receiving recess has a circular shape;
the first receiving recess has an open top;
the wrench body is provided with a second receiving recess beside the first receiving recess;
the second receiving recess has a diameter less than a diameter of the first receiving recess;
the second receiving recess has a center disposed in the first receiving recess;
the second receiving recess is connected to the first receiving recess;
the second receiving recess has an open top;
the second receiving recess has two first side faces;
the two first side faces are arranged symmetrically relative to the second receiving recess;
each of the two first side faces are a flat plane;
the second receiving recess is provided with two arcuate faces;
each of the two arcuate faces connect one of the two first side faces and the first receiving recess;
the wrench body is provided with a third receiving recess beside the second receiving recess;
the third receiving recess is connected to the second receiving recess;
the third receiving recess has an open top and an open bottom;
the third receiving recess is a circular hole penetrating the wrench body;
the wrench body is provided with a fourth receiving recess beside the third receiving recess;
the fourth receiving recess is connected to the third receiving recess;
an angle is defined between an axis of the fourth receiving recess and an axis of the third receiving recess;
the fourth receiving recess has a circular shape;
the wrench body has an open top provided with a cover groove;
the cover groove extends through the first receiving recess, the second receiving recess, and the third receiving recess;
the wrench body has a bottom provided with a closed end;
the closed end of the wrench body extends through the first receiving recess and the second receiving recess;
the wrench body is provided with a snap ring groove;
the cover groove is arranged between the first receiving recess and the snap ring groove;
the snap ring groove has an annular shape;
the wrench body is provided with a cutout;
the cutout is connected to the third receiving recess;
the cutout is proximate to the closed end;
the cutout is provided with two resting faces;
each of the two resting faces are a plane;
an angle is defined between the two first side faces;
the angle defined between the two first side faces is ranged between 55° and 65°;
the ratchet wheel is pivotally mounted in the first receiving recess;
the ratchet wheel has a periphery provided with a ratchet portion;
the ratchet portion is a toothed portion having an annular shape;
the ratchet wheel is provided with a mounting portion;
the ratchet wheel has an end provided with an end face;
the end face faces the cover groove;
the end face is provided with a first annular groove;
the first annular groove is arranged between the ratchet portion and the mounting portion;
the first annular groove has a ring shape;
the ratchet wheel is provided with a recessed portion facing the closed end;
the recessed portion is an arcuate depression;
the recessed portion decreases a friction area between the ratchet wheel and the closed end when the ratchet wheel is rotated in the first receiving recess;
the first ring is received in the first annular groove;
the first ring surrounds the mounting portion;
the first ring is made of resilient material;
the pawl member is received in the second receiving recess;
the pawl member is controlled and is movable leftward and rightward in the second receiving recess;
the pawl member has a front side provided with an engaging portion engaging the ratchet portion;
the engaging portion has a diameter;
the engaging portion has a first end provided with a first toothed part and a second end provided with a second toothed part;
the diameter of the engaging portion is more than a diameter of the ratchet portion, so that when the pawl member is received in the second receiving recess, a gap is defined between the first toothed part or the second toothed part and the ratchet portion;
the gap is increased gradually from a middle of the engaging portion toward the first toothed part or the second toothed part;
the pawl member has a rear side provided with a cavity;
the cavity has an arcuate shape;
the cavity has two first faces, a second face, and two third faces;
the two first faces are arranged at two corners of the cavity;
each of the two first faces are located at a deepest position of the cavity;
each of the two first faces are arranged between the second face and one of the two third faces;
each of the two first faces have a concave shape with a single diameter;
the second face is disposed at a middle of the cavity;
the second face has a convex shape;
the two first faces are arranged symmetrically relative to the second face;
the two third faces are arranged at two end openings of the cavity;
the two third faces are arranged symmetrically relative to the second face;
each of the two third faces are tangent to one of the two first faces;
each of the two third faces have a concave shape with a single diameter, the single diameter more than a diameter of each of the two first faces;
the pawl member is provided with a projection received in the cavity;
the projection is proximate to the closed end;
the pawl member is provided with a first abutting portion arranged between the projection and the cavity;
the first abutting portion has a planar shape;
the pawl member is provided with a second abutting portion facing the open top of the second receiving recess;
the cavity is arranged between the first abutting portion and the second abutting portion;
the second abutting portion has a planar shape;

the pawl member has two second side faces;

when the pawl member is received in the second receiving recess, one of the two second side faces rests on one of the two first side faces, and another one of the two second side faces is distant from another one of the two first side faces;

each of the two second side faces have a convex shape, so that when one of the two second side faces rests on one of the two first side faces, a contact between one of the two second side faces and one of the two first side faces defines a line segment;

the pawl member is pivoted with the line segment serving an axis so that the engaging portion engages the ratchet portion;

the direction control unit is pivotally mounted in the third receiving recess, and is rotated to move the pawl member leftward or rightward in the second receiving recess;

the direction control unit includes a rotation member, a first push member, a first elastic member, and a second ring;

the rotation member is provided with a cylindrical block;

the cylindrical block is pivotally mounted in the third receiving recess;

the cylindrical block is provided with a restriction hole;

the restriction hole aligns with the cavity;

the restriction hole has a circular shape;

the cylindrical block has a first end provided with three third abutting portions;

each of the three third abutting portions are directed toward the pawl member;

when the rotation member is rotated, at least one of the three third abutting portions rests on the second abutting portion, so that the pawl member is restricted by the three third abutting portions of the rotation member and cannot be detached from the second receiving recess of the wrench body;

the rotation member is provided with a drive knob received in the cutout;

the drive knob has a first side abutting one of the two resting faces;

when the rotation member is rotated, the drive knob has a second side abutting another one of the two resting faces;

the cylindrical block is provided with two first slots and a second slot;

one of the two first slots aligns with the fourth receiving recess;

when the direction control unit is rotated, and the pawl member is moved to a middle position of the second receiving recess, the second slot aligns with the fourth receiving recess;

the two first slots and the second slot are distant from the restriction hole;

the second slot is arranged between the two first slots;

the cylindrical block has a second end provided with a second annular groove;

the second annular groove is distant from the three third abutting portions;

the second annular groove has a concave ring shape;

the first push member and the first elastic member are assembled and received in the restriction hole;

the first push member has a first end provided with a thrust portion;

when the first push member is pushed by an elastic force of the first elastic member, the thrust portion presses one of the two first faces;

the thrust portion is restricted by one of the two third faces and will not be detached from the cavity;

the first push member has a second end provided with a pillar;

the pillar has a peripheral face abutting the first abutting portion;

the first push member is restricted by the first abutting portion, and the rotation member is restricted by the first push member, so that the rotation member is pivotally mounted and limited in the third receiving recess;

the pillar has a column shape;

the first push member is provided with a conic face located between the thrust portion and the pillar;

the thrust portion has a reduced diameter by provision of the conic face, so that the reduced diameter of the thrust portion mates with the single diameter of each of the two first faces;

when the rotation member is rotated, the thrust portion presses and passes the second face, and the first elastic member is compressed by the first push member, so that the first elastic member has an elastic resisting force when the rotation member is turned;

the second ring is retained in the second annular groove;

the second annular groove seals a gap between the rotation member and the third receiving recess;

the cover is received in the cover groove;

the cover closes the first receiving recess, the second receiving recess, and the third receiving recess;

the first ring is biased between the first annular groove and the cover;

the first ring seals the wrench body, the ratchet wheel, and the cover without a gap defined therebetween, so that the ratchet wrench has a waterproof effect;

the snap ring has a C-shaped configuration;

the snap ring is retained in the snap ring groove and rests on the cover;

the cover is restricted by the snap ring and cannot be detached from the cover groove;

the ratchet wrench further comprises a second push member and a second elastic member;

the second push member and the second elastic member are assembled and received in the fourth receiving recess;

the second push member is pushed by an elastic force of the second elastic member and presses one of the two first slots; and the second push member is used to position the direction control unit.

2. The ratchet wrench as claimed in claim 1, wherein each of the two first slots have an arcuate shape.

3. The ratchet wrench as claimed in claim 1, wherein a gap is defined between the cover and the end face.

4. The ratchet wrench as claimed in claim 1, wherein:

the cover is provided with a through hole;

the through hole has a circular shape; and the mounting portion protrudes from the through hole.

5. The ratchet wrench as claimed in claim 1, wherein the first receiving recess has a closed bottom with a solid surface.

6. The ratchet wrench as claimed in claim 1, wherein the second receiving recess has a closed bottom with a solid surface.

7. The ratchet wrench as claimed in claim 1, wherein the two first slots are located opposite to the restriction hole.

* * * * *